(12) United States Patent
Nakanosono

(10) Patent No.: US 6,276,475 B1
(45) Date of Patent: Aug. 21, 2001

(54) WHEEL HUB ELECTRIC MOTOR AND TRANSMISSION DRIVE UNIT

(75) Inventor: Haruhiko Nakanosono, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/371,312

(22) Filed: Aug. 10, 1999

(30) Foreign Application Priority Data

Aug. 18, 1998 (JP) .................................................. 10-231516

(51) Int. Cl.$^7$ ...................................................... B60K 1/00
(52) U.S. Cl. ............................................ 180/65.8; 310/67 R
(58) Field of Search ................................ 180/65.5, 65.6, 180/220, 214, 907, 205, 206, 207, 230; 74/594.2; 475/149, 183; 310/67 R, 67 A, 75 C, 183

(56) References Cited

U.S. PATENT DOCUMENTS

| | | | |
|---|---|---|---|
| 4,095,488 | * | 6/1978 | Nilsson .................................. 74/801 |
| 4,126,060 | * | 11/1978 | Rineer .................................... 74/798 |
| 4,346,777 | * | 8/1982 | Restelli ................................. 180/220 |
| 5,450,915 | * | 9/1995 | Li ......................................... 180/65.5 |
| 5,691,584 | * | 11/1997 | Toida et al. ......................... 310/67 R |
| 6,100,615 | * | 8/2000 | Birkestrand ......................... 310/75 C |

FOREIGN PATENT DOCUMENTS

| | | | |
|---|---|---|---|
| 2123362A | * | 2/1984 | (GB) ................................... 180/65.6 |
| 9-39872 | | 2/1997 | (JP) . |

* cited by examiner

Primary Examiner—Lanna Mai
Assistant Examiner—Gerald Klebe
(74) Attorney, Agent, or Firm—Ernest A. Beutler

(57) ABSTRACT

Two embodiments of electric motor and reduction gear transmissions for driving the hub of a vehicle wheel. The construction provides a very compact, low cost and low noise drive through the use of two planetary transmission incorporated within the hub and disposed between a pair of stub axle shafts that are fixed to the vehicle frame. One planetary transmission, the first, is of the frictional type and the second, which transmits higher torque than the first, is of the spur gear type. An improved wiring arrangement is also disclosed for powering the electric motor.

31 Claims, 5 Drawing Sheets

WHEEL HUB ELECTRIC MOTOR AND TRANSMISSION DRIVE UNIT

BACKGROUND OF THE INVENTION

This invention relates to a motor drive unit for an electric motor operated vehicle and more particularly to an improved, compact motor and reduction transmission unit for driving the hub of a vehicle wheel.

There is an increasing demand for the use of electric power driven or electric power assist, manually-driven vehicles. These vehicles may take many forms but bicycles are a common utilization of this type of vehicle propulsion system. It is important that the motor and its driving transmission can be compact so as to facilitate the utilization of the electric motor and transmission with generally conventional-type vehicles.

Ideally, the motor and transmission could be assembled as a part of the hub of a driving wheel for the vehicle. This gives rise to considerable problems in providing both a compact arrangement and also one which will have a high enough speed reduction to make its utilization in an in-the-hub mounting practical.

It has been proposed to provide a unit wherein the electric motor has its output shaft generally tubular in nature and journaled around a fixed axle of the drive unit. This then drives the hub of the motor transmission unit through a two-stage planetary gear reduction transmission. The gears of the transmission also are disposed around this fixed axle shaft. As a result, the construction becomes quite large.

Part of the size increase is due to the fact that the transmission must provide a fairly substantial step-down in the ratio of speed between the output shaft of the electric motor and the driven hub of the wheel. This is one reason why a two-stage planetary reduction gear is employed. Nevertheless, because the transmission must encircle the fixed axle, the overall size becomes unacceptably large.

It is, therefore, a principal object of this invention to provide an improved electric motor reduction gear transmission drive assembly for the hub of a driven wheel of a vehicle.

It is a further object of this invention to provide a compact motor step-down transmission for such a purpose that can be utilized within the hub of a generally conventional wheel and which can be mounted on a generally conventional vehicle in the manner that a non-driven wheel is mounted.

Aside from these difficulties, there is also the problem of noise generated by the large gear reductions provided through the two planetary transmissions. Because of the fact that the gears are quite large and because of the high reduction ratio, noise is a constant problem with the prior art type constructions, particularly those mentioned above.

It is, therefore, a still further object of this invention to provide an improved step-down transmission for an electric motor driven vehicle wheel hub.

It is a further object of this invention to provide a two-stage planetary gear reduction unit for a transmission that incorporates a frictional transmission in its primary stage so as to reduce size and noise without diminishing the torque transmitting capabilities of the transmission.

In addition to the problems already noted in connection with the making of a compact motor reduction gear transmission for driving the hub of a vehicle wheel, there is additionally the problem of transmitting the electrical power to the motor for controlling its operation. Frequently, these types of motors are utilized in drive systems where there is also, as previously noted, primarily manual propulsion for the vehicle. Many of these arrangements employ controls that sense the amount of manual power input and then provide an electric motor assist in proportion to the amount of manual power applied for driving the vehicle. Various control strategies and relationships between input power, vehicle speed and other factors are employed for this control.

Nevertheless, it is necessary to transmit both electrical power from a storage battery or other electric power source and control signals to the motor for its operation. This provides additional problems in connection with maintaining a small size and also in reducing the number of electrical components that must pass through the housing to the motor and drive unit.

It is, therefore, a still further object of this invention to provide an improved and compact electric motor and reduction unit for driving a vehicle wheel hub and which incorporates a simplified and effective electric supply arrangement for transmitting electrical power to the motor.

SUMMARY OF THE INVENTION

All of the features of this invention are adapted to be embodied in an electric motor and drive hub arrangement for driving a vehicle wheel. The drive hub arrangement includes a fixed axle support that is fixed to the associated vehicle, an electric motor contained within the vehicle hub and a reduction transmission for driving the hub from the output shaft of electric motor.

In accordance with a first feature of the invention, the fixed axle support is comprised of a pair of spaced apart axle portions. Each of these axle portions has an outer end part that is adapted to be affixed in fixed relationship to the vehicle. Each axle portion further has an inner end part that forms a journal for the hub of the vehicle wheel. These inner end parts are spaced axially from each other to define a gap therebetween. An electric motor is positioned with the hub and has its driven shaft rotatably journaled in the area between the inner parts of the axle portions. This driven shaft of the electric motor drives the hub through a reduction transmission that is also supported at least in part between the inner end parts of the axle portions.

Another feature of the invention is adapted to be embodied in the reduction transmission. The reduction transmission comprises a first, frictional planetary transmission having its sun gear driven by the electric motor drive shaft. Another component of this first frictional planetary transmission drives a member of a second planetary transmission that has intermeshing gears. The output of this second planetary transmission drives the hub.

A third feature of the invention is also adapted to be embodied in a motor reduction gear hub driving arrangement as aforenoted. In connection with this feature of the invention, a control plate is mounted within the hub on one side of the electric motor. The outer housing has a pair of openings that pass a pair of electric wire conductors for transmitting electric power and control signals for controlling and powering the electric motor.

DETAILED DESCRIPTION OF THE PREFERRED EMBODIMENTS OF THE INVENTION

Embodiment of FIGS. 1–5

Figure 1:
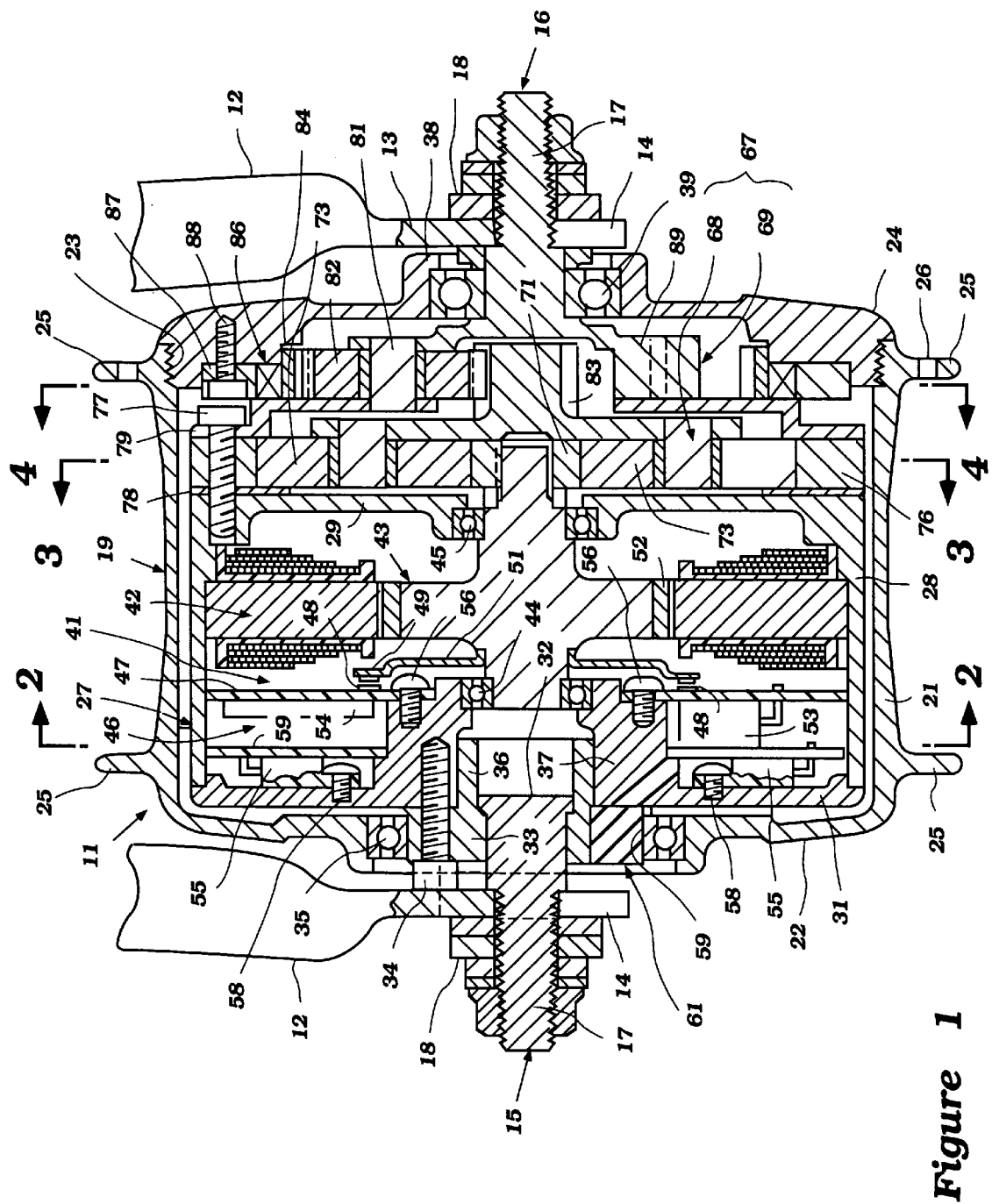
FIG. 1 is a cross-sectional view taken through the axis of the hub portion of a driven vehicle wheel and its mounting and shows a first embodiment of the invention.

FIGS. 1–5 show a first embodiment of the invention and particularly an embodiment where a combined wheel hub, electric motor drive and reduction gear transmission, indicated generally by the reference numeral 11 is adapted to be utilized with a vehicle wherein the manual power for the vehicle is not applied to the wheel with which the hub 11 is associated.

In the specific embodiment illustrated, the hub 11 is particularly adapted, though not specifically limited, to use with a bicycle that is primarily propelled by a manual power. Accordingly, the driving wheel 11 is mounted on the depending side members 12 of the dirigible front fork assembly of the associated vehicle.

This front fork assembly 12 is of any known type and basically has a pair of flattened portions 13 which are formed with slotted openings 14 to receive a pair of axle end portions, indicated by the reference numerals 15 and 16, respectively. Each axle portion 15 and 16 has a threaded outer end part 17 that is adapted to be received in the fork slots 14 and fixed axially relative thereto by threaded fastener assemblies 18 in a manner of the same type as with a conventional bicycle front wheel.

The driving wheel assembly 11 includes a hub portion, indicated generally by the reference numeral 19 and which is comprised of a first generally cup-shaped member 21 that has an integral end wall 22 at one side thereof and a threaded opening 23 at the other end thereof. A closure plate 24 has a male threaded portion that is threaded into the threaded opening 23 to define an enclosure in which the electric drive motor and its transmission, to be described shortly, is contained.

The hub portion 19 has a pair of peripheral flanges 25 in which openings 26 are formed so as to receive the ends of wire spokes that interconnect the inner hub portion 19 to the outer rim of the associated wheel. Rather than a spoked wheel, as described, the invention also may be utilized with disc-type wheels.

Contained within the cavity formed by the outer hub 19 and its end closure 24, there is an inner housing assembly, indicated generally by the reference numeral 27. This inner housing assembly 27 is comprised of a generally cup-shape member 28 having an integral end wall 29. The opposite end thereof is closed by a closure plate 31 which is fixed to the member 27 in any suitable manner. These pieces 27 and 31 are preferably formed from a lightweight material having a high thermal conductivity such as aluminum or an aluminum alloy.

The axle portion 15 has an inner end 32 which has a stepped diameter and which is received within a corresponding opening formed by a mounting member 33. The mounting member 33 is non-rotatably fixed to relative to the inner housing 27 and specifically its closure plate 31 by means of a plurality of threaded fasteners 34. Preferably, the threaded fasteners 34 and closure member 33 are formed from a higher strength heavier material, such as steel.

The hub 19 of the wheel is journaled on the axle portion 15 by means of an anti-friction, ball bearing 35 that is captured in an opening of the end wall 22 of the hub member 19 and around the mounting member 33. Thus, the inner housing assembly is non-rotatably fixed relative to the associated vehicle.

The mounting member 33 has a pilot portion 36 which is journaled within a corresponding bore found in the closure plate 31 as indicated at 37.

The threaded end closure 24 which completes the hub assembly 19 is formed with a bearing supporting portion 38 that receives a further ball bearing assembly 39 for jouraling this side of the hub portion 19 on the axle portion 16.

A brush less type electric motor, indicated generally by the reference numeral 41 is mounted within the cavity formed by the inner housing 27. This electric motor 41 includes a stator 42 that is fixed suitably to the inner housing member 28 in the area between the inner ends of the axle portions 15 and 16.

The stator 42 cooperates with a rotor or drive shaft 43 of the electric motor 41 which rotor is journaled in the area between the inner ends of the axle portions 15 and 16 by means of a pair of spaced apart ball bearing assemblies 44 and 45. The ball bearing assembly 45 is fixed to the end closure 31 of the housing 27. The bearing 45 is journaled by the end plate 29 which is formed integrally with the housing member 28, as aforenoted.

Thus, the rotor 43 is actually journaled for rotation about an axis that is coincident with the axes defined by the axle portions 15 and 16. However, it is not necessary to make this rotor 43 tubular because it can be positioned in the space between the stub axle portions 15 and 16 and thus permit a smaller diameter than with the previously utilized constructions.

Also contained within the inner housing 27 is a controller assembly, indicated generally by the reference numeral 46 for controlling the operation of the electric motor 41. This controller 46 includes a base plate 47 which has mounted on one side of it a Hall-type detecting element 48 that cooperates with magnets 49 that are fixed to a detecting plate 51 that is fixed to the rotor 43 in a suitable manner and inwardly of its magnetic poles 52.

Figure 5:
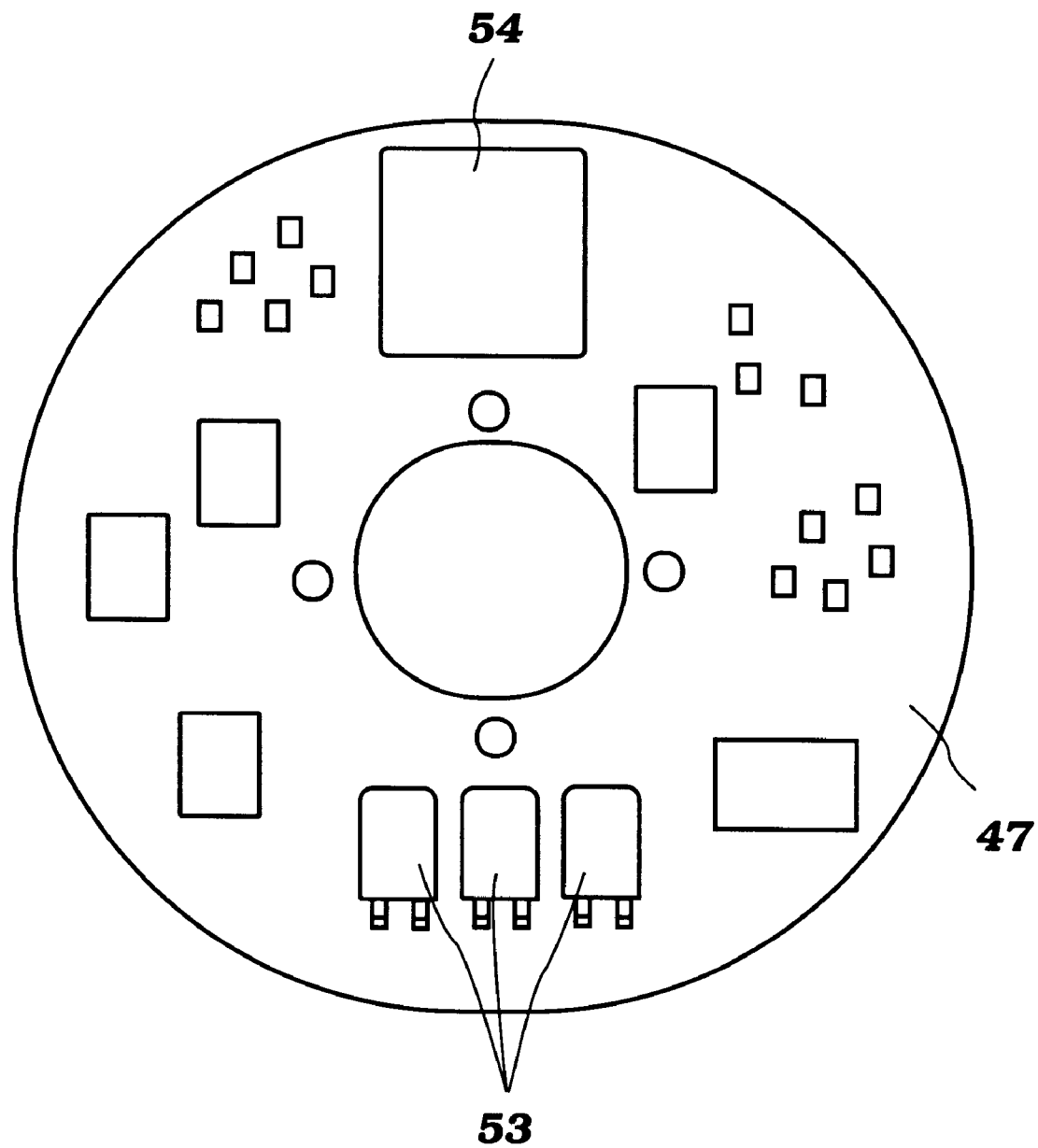
FIG. 5 is a cross-sectional view taken along the line 5—5 of FIG. 1 and shows the electric component mounting plate.

Mounted on the opposite side of the support plate 47 are a group of capacitors 53 which appear in FIG. 5. By utilizing a plurality of capacitors 53, rather than a single large capacitor, it is possible to make the construction much more compact. The capacitors 53 serve the function of eliminating switching noise. Each of the capacitors has the same capacitance and by positioning them in side-by-side relationship to each other as seen best in FIG. 5, the axial width of the hub 19 can be kept small and be maintained in an arrangement for replacing a conventional bicycle wheel without necessitating a new fork assembly.

Also mounted on this side of the support plate 47 is an IC 54 which may provide all or part of the controlling function for controlling the operation of the electric motor 41. This cooperates with switching units such as FETs 55 which are also mounted adjacent this side of the support plate 47. This way, the construction can be kept very compact. In addition, the connection of the support plate 47 to the aluminum housing assembly 27 ensures rapid heat transfer and does good heat dissipation.

The support plate 47 is affixed to the end portion 37 of the housing assembly 28 by a plurality of threaded fasteners 56. The FETs 55 are mounted on a second support plate 57 which is juxtaposed to the support plate 47 but spaced axially upwardly therefrom. This support plate 57 if fixed to the end plate 31 by threaded fasteners 58.

Figure 2:
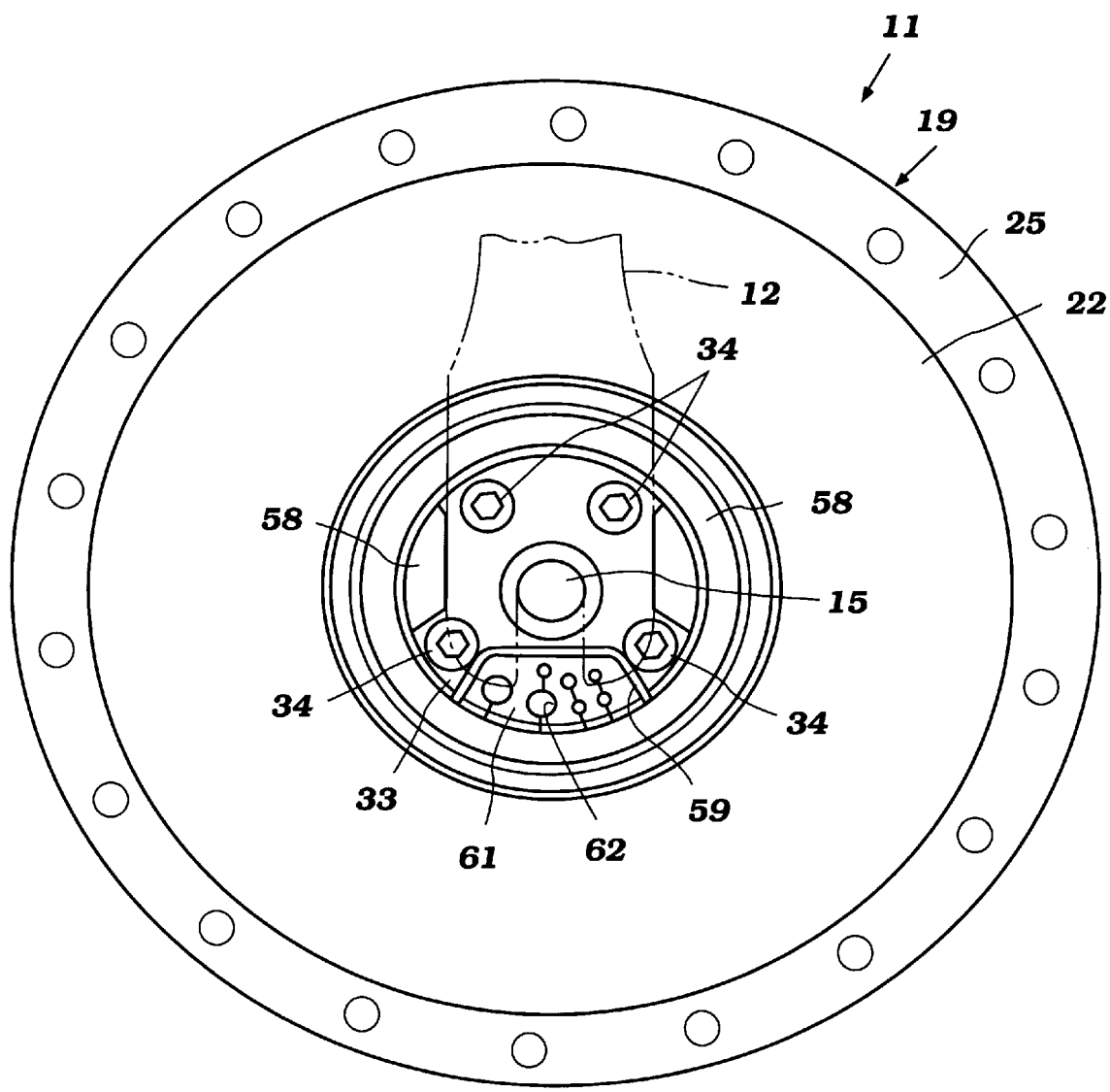
FIG. 2 is a side elevational view of the hub arrangement shown in FIG. 1 with the vehicle supporting member being shown in phantom so as to more clearly illustrate the construction.

As may be best seen in FIG. 2, the supporting member 33 is provided with a pair of outstanding lugs 58 that engage opposite sides of the fork portion 12 so as to further ensure against rotation of the inner housing 27 relative to the axle portions 15 and 16.

The supporting member 33 is formed with a recess or cutout 59 in which an elastic body 61 is received. Openings 62 are formed in this elastic body so as to pass the large diameter wiring for supplying electric power to the motor 41. In this way, the constructions can be kept quite compact and simple and no brushes or wiper contacts are required for transmitting the electrical power to the motor 41. Smaller openings also may be formed in this elastic member 61 so as to pass wires from a remote controller to the motor control 46.

The step-down transmission for reducing the speed of the rotor 43 or drive shaft of the electric motor 41 and coupling it to drive the hub 19 will be described next by reference primarily to FIGS. 1, 3 and 4. This step-down transmission is indicated generally by the reference numeral 67 and includes a first, frictional planetary transmission indicated generally by the reference numeral 68, and a second, intermeshing gear type planetary transmission, indicated generally by the reference numeral 69.

Figure 3:
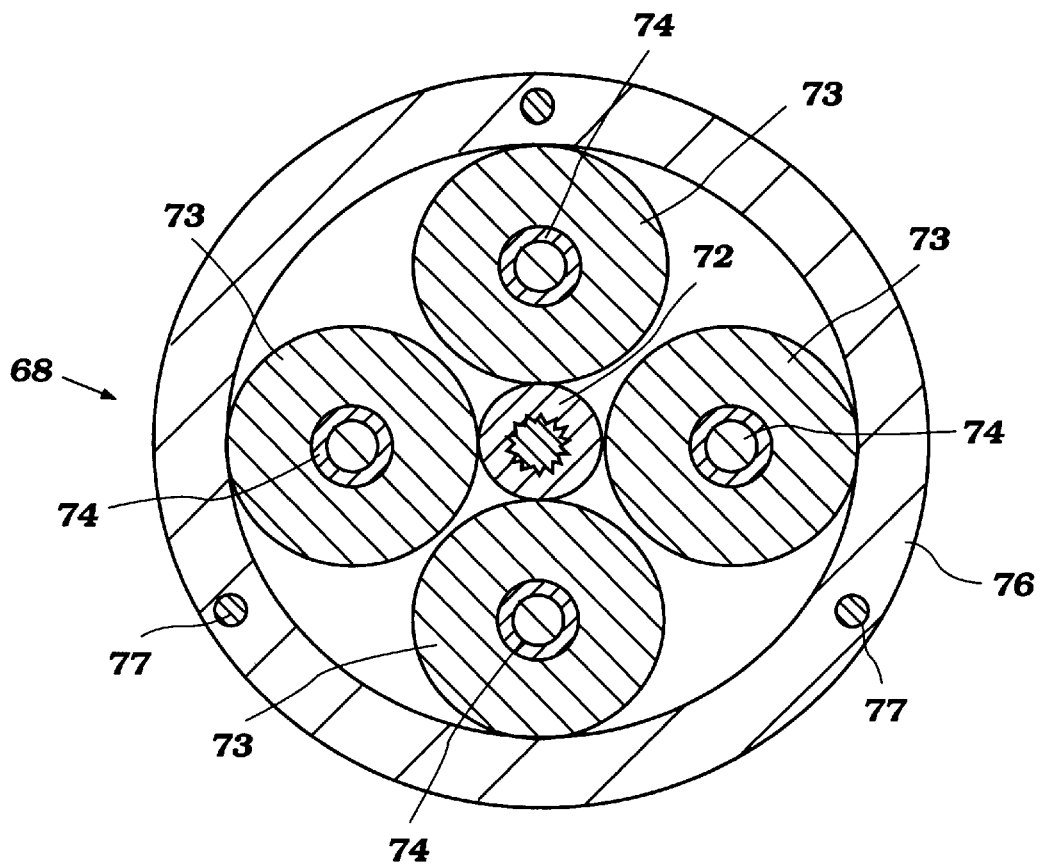
FIG. 3 is a cross-sectional view taken along the line 3—3 of FIG. 1 and shows the first stage, frictional planetary gear step down transmission of the reducing transmission that drives the hub.
Figure 4:
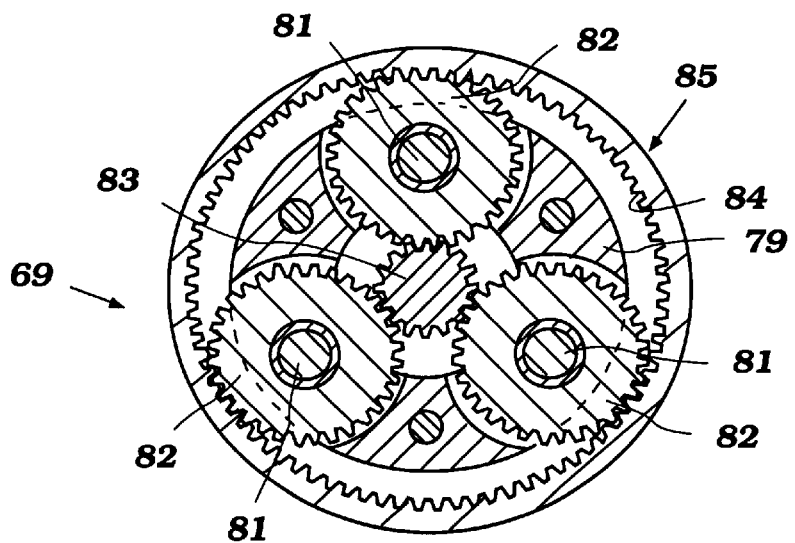
FIG. 4 is a cross-sectional view taken along the line 4—4 of FIG. 1 and shows the second stage, spur gear planetary reduction transmission.

The first planetary transmission 68 is shown in FIG. 3 and constitutes a sun gear 71 which may be formed integrally with the motor shaft 43 or preferably is splined to it. This sun gear 42 is held into tight frictional contact with a plurality of planet gears 73, each of which is supported for rotation on a respective support pin 74. The support pins 74 form a portion of a carrier 75.

Radially outwardly of the planet gears 73, they are in frictional contact with the inner surface of a ring gear 76 that is fixed against rotation with the housing assembly 28 by means of threaded fasteners 77.

Thus, the first stage of speed reduction is accomplished by this first planetary transmission 68 which does not transmit high torque due to the high speed output of the motor shaft 43 and thus, does not place a large load on the frictional transmission. This also permits the use of relatively small lightweight gears which can be conveniently provided within the hub assembly 19.

It should be noted that a spacer member 78 is interposed between the ring gear 76 and the end member 29 of the housing piece 27.

The fasteners 77 also secure a second carrier 79 to the housing assembly 27 and thus, fix this carrier 79 against rotation. The carrier 79 forms a part of the second planetary transmission 69. The carrier 79 has a plurality of axially outwardly extending carrier shafts 81 upon which planet gears 82 are journaled.

The planet gears 82 are, in turn, enmeshed on their inner periphery with a spur-type sun gear 83. This sun gear 83 is affixed to the carrier 76 of the first planetary transmission 68 and thus, provides the reduced speed input from the first planetary transmission 68 to the second planetary transmission 69.

Exterior portions of the planet gears 82 are enmeshed with a ring gear 84 which constitutes the output element of this second planetary transmission 69. The ring gear 84 has an outer peripheral edge 85 which drives the hub assembly 19 via a one-way clutch 86. This drive through the one-way clutch 86 is transmitted to the cover piece 24 of the hub member 19 by means of a drive ring 87 which is affixed thereto by threaded fasteners 88.

The one-way clutch 86 permits the hub to overdrive the electric motor 41 at such times as it is not assisting in the driving of the wheel with which the hub 19 is associated.

Since the drive reduction in the second planetary transmission 69 transmits a higher torque, the spur gear transmission is used at this location and the gears 82, 83 and 84 may be formed from a higher strength material than the gears of the frictional planetary transmission 68. However, their diameter still can be kept fairly small since both transmissions are in essence received within the space between the innermost end of the axle portions 15 and 16.

It should be noted that the stub axle portion 16 and particularly the inner peripheral edge thereof may be formed with an enlarged exterior portion 89 which can be provided with apertures to receive the ends of the pins 81 and thus, further hold the carrier 79 against rotation and further strengthen this portion of the transmission without adding to its overall size.

Figure 6:
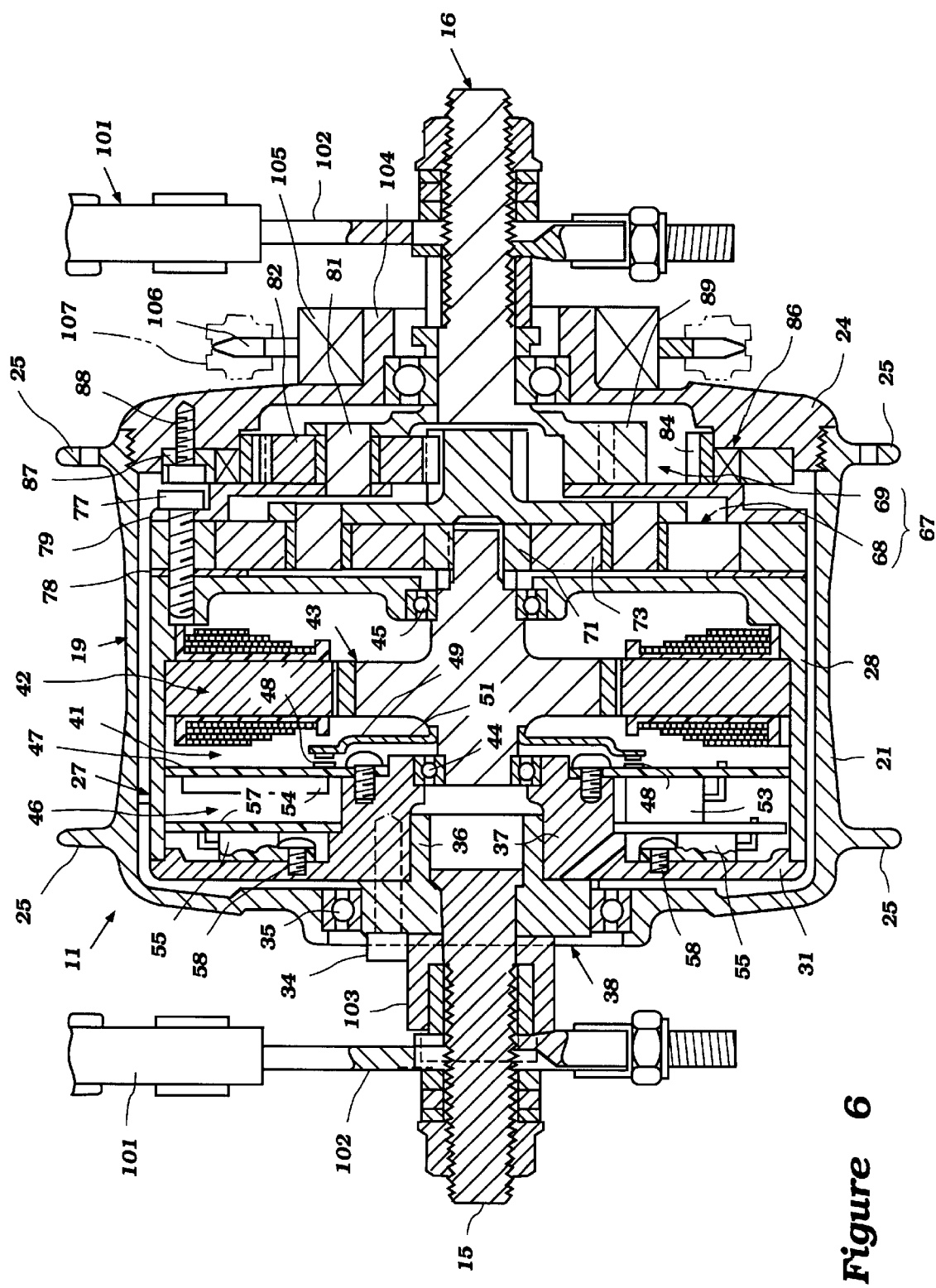
FIG. 6 is a cross-sectional view, in part similar to FIG. 1, and shows another embodiment of the invention.

Embodiment of FIG. 6

As has been noted, the embodiment of FIGS. 1–5 is designed so as to primarily provide an electric motor drive for a normally non-driven wheel of a vehicle such as a bicycle. It is also possible, however, to utilize this arrangement in conjunction with a driven wheel of the vehicle that is normally powered by manual force. FIG. 6 shows such an embodiment that is utilized in combination with a rear wheel for a power assisted bicycle.

Since the basic electric motor construction and construction of the outer housing is seen as that previously described, components which are the same or substantially the same as the previously described embodiment have been identified by the same reference numerals and will not be described again, except insofar as is necessary to understand the construction and operation of this embodiment.

In this embodiment, the stub axle portions 15 and 16 are supported by back stays of the vehicle frame 101, these back stays being indicated by the reference numeral 102. Thus, with this embodiment, the anti-rotation features provided by the stoppers 58 of the previously described embodiment are provided by means of a shaft member 103 which is attached to the support disc 33 in any suitable manner such as by the fasteners 34.

On the opposite side, the outer housing end piece 24 is provided with a cylindrical extension 104 that is connected via a one-way clutch 105 to a driven sprocket 106. The manually operated or pedaled chain 107, shown in phantom in this figure, is encircled around a crank sprocket driven by a pedal mechanism in a known manner for providing manual power drive to the wheel with which the hub 19 or motor and transmission assembly 11 is associated.

Thus, from the foregoing description it should be readily apparent that the preferred embodiments of the invention described will serve the purpose of providing a small compact lightweight electric motor and reduction transmission mechanism for driving a vehicle wheel and incorporation within the hub thereof. Of course, those skilled in the art will readily appreciate that the foregoing description is that of preferred embodiments of the invention and that various changes and modifications may be made without departing from the spirit and scope of the invention, as defined by the appended claims.

What is claimed is:

1. An electric motor and drive hub arrangement for driving a vehicle wheel, said drive hub arrangement including a fixed axle support that is fixed to the associated vehicle, an electric motor contained within said drive hub and a reduction transmission for driving said drive hub from an output shaft of said electric motor, said electric motor being comprised of a rotor formed with said output shaft and carrying a plurality of spaced permanent magnets, and a stator comprised of a plurality of circumferentially spaced armature coils cooperating with said permanent magnets to effect rotation of said output shaft, said fixed axle support being comprised of a pair of spaced apart axle portions, each of said axle portions having an outer end part adapted to be affixed in fixed relationship to the vehicle, said electric motor stator being fixed against rotation relative to said axle portions, each axle portion further having an inner end part that forms a journal for said drive hub, said inner end parts being spaced axially from each other to define a gap therebetween, said electric motor being positioned within said drive hub with said output shaft rotatably journaled in the area between said inner end parts of said axle portions, said electric motor output shaft driving said drive hub through said reduction transmission, said reduction transmission being supported at least in part between said inner end parts of said axle portions.

2. The electric motor and drive hub arrangement as set forth in claim 1 wherein the axis of the motor driven shaft is coaxial with the rotational axis for the hub defined by the axle portions.

3. The electric motor and drive hub arrangement as set forth in claim 1 wherein the drive hub forms a first, generally cylindrical housing in which a second housing is positioned and in which the electric motor is contained.

4. The electric motor and drive hub arrangement as set forth in claim 3 wherein the second housing is fixed against rotation relative to the axle portions and the stator is fixed to said second housing.

5. The electric motor and drive hub arrangement as set forth in claim 4 wherein the drive hub is journalled for rotation at least in part on the second housing.

6. The electric motor and drive hub arrangement as set forth in claim 5 wherein one side of the drive hub is journalled for rotation on the second housing and the other side of said drive hub is journalled on one of the axle portions.

7. The electric motor and drive hub arrangement as set forth in claim 6 wherein the axis of the motor output shaft is coaxial with the rotational axis for the hub defined by the axle portions.

8. The electric motor and drive hub arrangement as set forth in claim 7 wherein the ends of the motor output shaft are journalled by the second housing.

9. The electric motor and drive hub arrangement as set forth in claim 3 wherein a control plate is mounted within the drive hub on one side of the electric motor for controlling the operation of said electric motor.

10. The electric motor and drive hub arrangement as set forth in claim 9 wherein the control plate is mounted within the second housing.

11. The electric motor and drive hub arrangement as set forth in claim 10 wherein the second housing has an end plate juxtaposed to one of the axle portions, said end plate having openings that pass a pair of electric wire conductors for transmitting electric power and control signals for controlling and powering the electric motor.

12. An electric motor and drive hub arrangement for driving a vehicle wheel, said drive hub arrangement including a fixed axle support that is fixed to the associated vehicle, an electric motor contained within said drive hub and a reduction transmission for driving said drive hub from an output shaft of said electric motor, said fixed axle support being comprised of a pair of spaced apart axle portions, each of said axle portions having an outer end part adapted to be affixed in fixed relationship to the vehicle, each axle portion further having an inner end part that forms a journal for said drive hub, said inner end parts being spaced axially from each other to define a gap therebetween said electric motor being positioned within said drive hub and having said output shaft rotatably journaled in the area between said inner end parts of said axle portions, said output driving said drive hub through said reduction transmission, said reduction transmission being supported at least in part between said inner end parts of said axle portions and comprising a first planetary transmission driven by said output shaft and a second planetary transmission driven by said first planetary transmission and driving said drive hub.

13. The electric motor and drive hub arrangement as set forth in claim 12 wherein the first planetary transmission is disposed entirely between the inner end parts of the axle portions.

14. The electric motor and drive hub arrangement as set forth in claim 13 wherein the second planetary transmission is disposed substantially, entirely between the inner end parts of the axle portions.

15. The electric motor and drive hub arrangement as set forth in claim 12 wherein the electric motor driven shaft drives a sun gear of the first planetary transmission.

16. The electric motor and drive hub arrangement as set forth in claim 15 wherein a ring gear of the first planetary transmission is fixed against rotation and a carrier of the first planetary transmission drives the second planetary transmission.

17. The electric motor and drive hub arrangement as set forth in claim 16 wherein the carrier of the first planetary transmission drives a sun gear of the second planetary transmission.

18. The electric motor and drive hub arrangement as set forth in claim 17 wherein a carrier of the second planetary transmission is fixed against rotation and a ring gear of the second planetary transmission drives the drive hub.

19. The electric motor and drive hub arrangement as set forth in claim 12 wherein the axis of the motor driven shaft is coaxial with the rotational axis for the hub defined by the axle portions.

20. The electric motor and drive hub arrangement as set forth in claim 19 wherein a control plate is mounted within the drive hub on one side of the electric motor for controlling the operation of said electric motor.

21. The electric motor and drive hub arrangement as set forth in claim 19 wherein one of the planetary transmissions comprises a frictional transmission.

22. The electric motor and drive hub arrangement as set forth in claim 21 wherein the other of the planetary transmissions comprises an intermeshing gear transmission.

23. The electric motor and drive hub arrangement as set forth in claim 22 wherein the frictional planetary transmissions comprises the first planetary transmission.

24. An electric motor and drive hub arrangement for driving a vehicle wheel, said drive hub arrangement including a fixed axle support that is fixed to the associated vehicle, an electric motor having a drive shaft contained within said drive hub and a reduction transmission for driving said drive hub from drive shaft of said electric motor, said reduction transmission comprises a first, frictional planetary transmission having its sun gear driven by said electric motor drive shaft and another component of said first frictional planetary transmission driving a member of a second planetary transmission having intermeshing gears, and an output of said second planetary transmission driving said drive hub.

25. The electric motor and drive hub arrangement as set forth in claim 24 wherein a ring gear of the first planetary transmission is fixed against rotation and a carrier of the first planetary transmission drives the second planetary transmission.

26. The electric motor and drive hub arrangement as set forth in claim 25 wherein the carrier of the first planetary transmission drives a sun gear of the second planetary transmission.

27. The electric motor and drive hub arrangement as set forth in claim 26 wherein a carrier of the second planetary transmission is fixed against rotation and a ring gear of the second planetary transmission drives the drive hub.

28. The electric motor and drive hub arrangement as set forth in claim 27 wherein the axis of the motor driven shaft is coaxial with the rotational axis for the hub defined by the axle portions.

29. The electric motor and drive hub arrangement as set forth in claim 28 wherein a control plate is mounted within the drive hub on one side of the electric motor for controlling the operation of said electric motor.

30. The electric motor and drive hub arrangement as set forth in claim 29 wherein the drive hub has a pair of openings that pass a pair of electric wire conductors for transmitting electric power and control signals for controlling and powering the electric motor.

31. An electric motor and drive hub arrangement for driving a vehicle wheel, said drive hub arrangement including a fixed axle support that is fixed to the associated vehicle, an electric motor having a drive shaft contained within a second housing that is contained within said drive hub and held against rotation relative to said fixed axle support, a reduction transmission for driving said drive hub from said electric motor drive shaft, a control plate mounted within said second housing on one side of said electric motor, said second housing having a pair of openings that pass a pair of electric wire conductors for transmitting electric power and control signals for controlling and powering said electric motor.

* * * * *